United States Patent [19]

Olson

[11] Patent Number: 4,461,080
[45] Date of Patent: Jul. 24, 1984

[54] EVISCERATING AND SURVIVAL TOOL

[76] Inventor: Winston O. Olson, 5806 Dorsett Dr., Madison, Wis. 53711

[21] Appl. No.: 293,154

[22] Filed: Aug. 17, 1981

[51] Int. Cl.³ .............................................. B26B 11/00
[52] U.S. Cl. ......................................... 30/144; 7/161; 7/168; 17/66; 294/55.5
[58] Field of Search ...................... 30/153, 144, 123.7, 30/142; 7/110, 113, 114, 115, 148, 159, 161, 168; 17/21, 23, 66, 69; 81/177 A, 177 E; 403/79, 319; 294/51, 55.5

[56] References Cited

U.S. PATENT DOCUMENTS

| 273,568 | 3/1883 | Marshall | 7/115 |
| 786,766 | 4/1905 | Hunt | 7/161 X |
| 3,350,866 | 11/1967 | Spencer | 294/51 |
| 4,114,216 | 9/1978 | Gatby | 81/177 A |

FOREIGN PATENT DOCUMENTS 454694  7/1913  France .................................. 30/153

Primary Examiner—E. R. Kazenske
Assistant Examiner—Douglas D. Watts

[57] ABSTRACT

An eviscerating and survival tool having a shaft with a handle at one end, a claw-like hook at the other end, the hook being comprised of at least two arcuately shaped tines defining a slot, and as saw blade disposed longitudinally along the portion of the shaft near the end containing said hook. In its preferred form the shaft is in two approximately equal portions connected by pivotable fastening means to permit the two parts of the shaft to be folded against each other with means to maintain the two parts in rigid end-to-end relationship in use.

2 Claims, 18 Drawing Figures

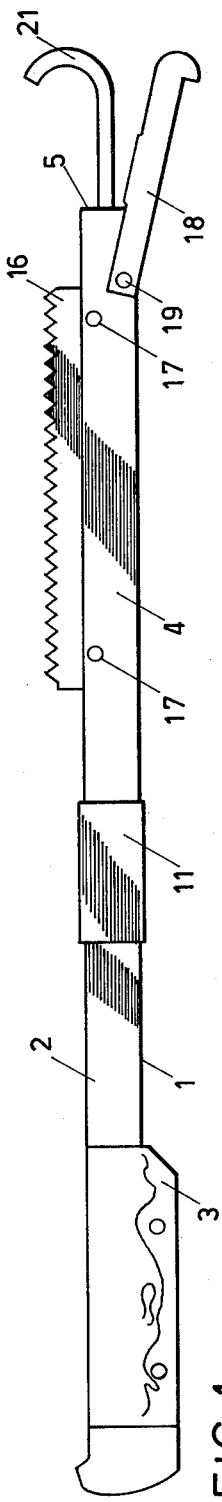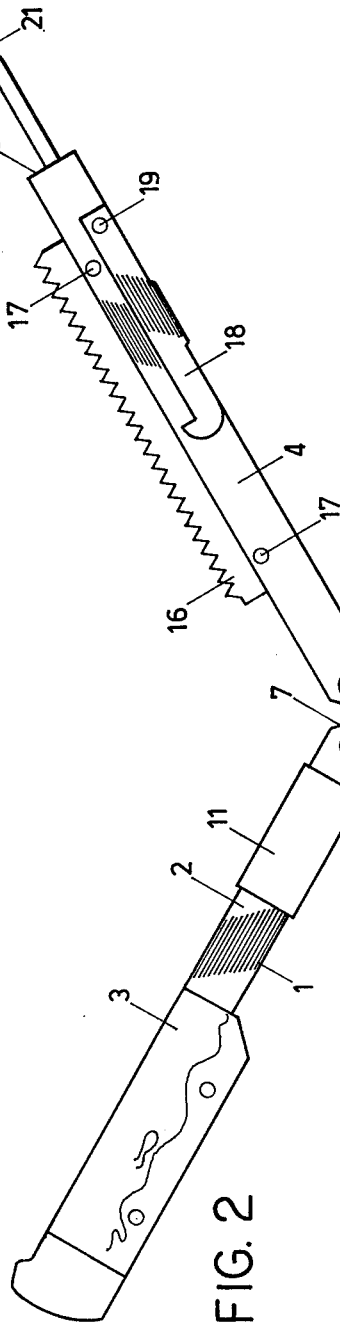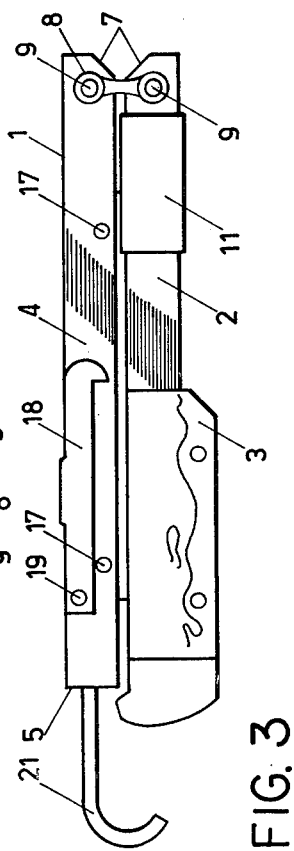
FIG. 1
FIG. 2
FIG. 3

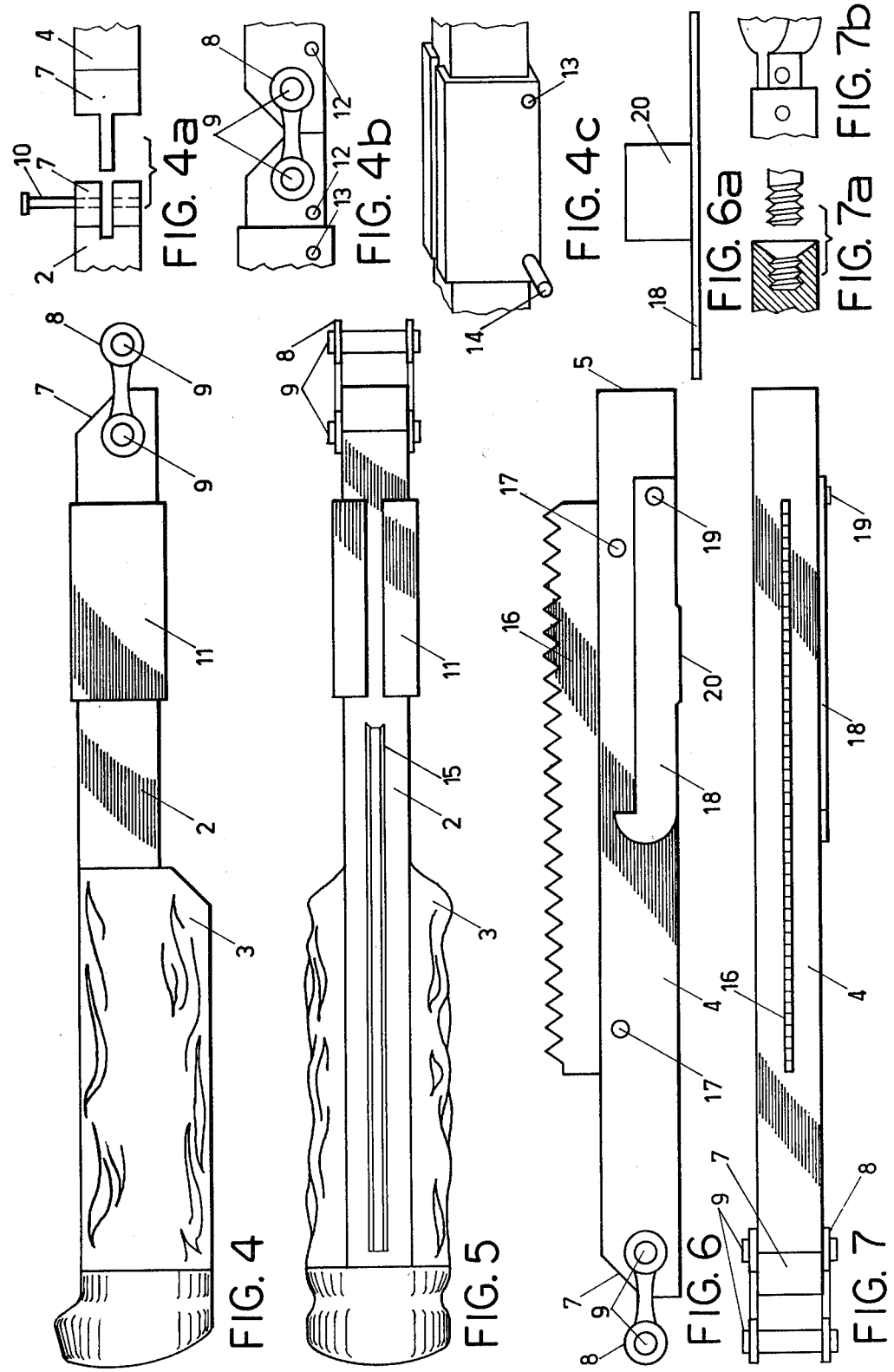

EVISCERATING AND SURVIVAL TOOL

This invention relates to an eviscerating tool.

More particularly, this invention relates to a tool which can be used to eviscerate animals, fowl and fish and which also finds ready application as a survival tool.

The tool of this invention serves as an indispensible aid to the hunter and can be sized to accommodate either large or small animals, fowl and even fish.

Eviscerating a large animal in the field, e.g. deer, is considered by most to be an unpleasant and messy chore the inevitable result being that the person doing the eviscerating utilizing standard tools, e.g. a large knife, generally becomes well spattered with blood. The hands and arms are particularly vulnerable to becoming covered with blood since they must be inserted into the carcass to remove the entrails. In addition, in utilizing a knife only it is difficult to cleanly and completely remove all of the entrails since to accomplish that feat the pelvic bone must be split, a difficult task with a knife. Generally the knife is used to chop at the bone or, at times, a small hatchet is used for that purpose. The disadvantages attendant upon such procedure, in addition to the heavy work involved, is the possibility of puncturing or tearing the entrails and releasing their contents into the carcass, thereby contaminating the carcass.

The tool of the present invention overcomes these difficulties. It provides means by which all of the steps involved in eviscerating an animal can be carried out neatly and conveniently in the field and with a minimum probability of carcass contamination. Moreover in the foldable configuration shown in the accompanying drawings it can be easily and safely carried in the field although it should be understood that the tool can, as conveniently, be in a non-foldable configuration.

In the accompanying drawings, reference to which, along with the following discussion, will promote a better understanding of the invention:

FIG. 1 shows the foldable eviscerating tool of this invention in its fully extended and locked position, with the optional slitting blade carried on the shaft in position for use.

FIG. 2 shows the foldable eviscerating tool of this invention in a partially folded position.

FIG. 3 shows said tool in completely closed or folded position.

FIG. 4 shows a side view of the handle portion of the foldable tool shown in FIGS. 1, 2 and 3.

FIG. 4a shows an alternative means for pivotably joining the handle and shank portions of the tool of this invention.

FIGS. 4b and 4c show alternative means for locking the pivoted joint between the handle portion and shank portion of the tool into a single rigid shaft.

FIG. 5 is a plan view of the handle portion of the tool shown in FIG. 4.

FIG. 6 is a side view of the shank portion of the foldable tool shown in FIGS. 1, 2 and 3 showing the optional pivotable slitting knife attached to the shank in closed position.

FIG. 6a is a plan view of the slitting knife shown in FIG. 6.

FIG. 7 is a plan view of the shank portion of the tool shown in FIG. 6.

FIGS. 7a and 7b show alternative means for fastening tool heads to the terminal end of the shank portion of the tool.

FIG. 9b shows a plan view of the pivotable slitting knife shown in FIG. 9a.

Figure 8A:
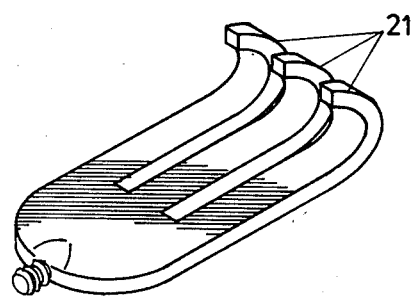
FIGS. 8a, 8b and 8c show different tool heads for fastening to the end of the tool shank.

In the drawings, in which like elements are designated by like numbers, 1 represents a foldable eviscerating tool of this invention. In such tool 2 represents the handle portion of the tool with appropriate contoured gripping aids, generally made of plastic, bone or other suitable substance, represented by 3. 4 designates the shank portion of the tool which, at its terminal end 5, is drilled and tapped or has a recessed socket to receive various tool heads. Pivotable fastening means joins handle portion 1 with shank portion 4 to permit the two portions to be aligned in end-to-end relationship to comprise the extended shaft of tool 1. Both handle portion 2 and shank portion 4 have a chamfer 7 at their abutting ends to permit one portion to be rotated 180° about the fastening means and folded flat against the other portion.

Handle portion 2 and shank portion 4 are joined in foldable relationship by pivotable fastener 8 which can conveniently be a link from a standard bicycle chain. Such link is chosen so that its span between fastening pins 9 will be sufficiently great to permit handle portion 2 and shank portion 4 to be folded flat against each other as shown in FIG. 3. Other pivotable fastening means for the handle and shank portions, 2 and 4, of tool 1 will be readily apparent. For example, a tongue and groove configuration, as shown in FIG. 4a, permits the handle and shank to be readily held together by the insertion of pin 10, through pre-drilled holes in the tongue and the side elements defining the groove.

To permit handle portion 2 and shank portion 4 to be held in end-to-end relationship so as to afford tool 1 with a rigid shaft during use slide 11, which is in wrap-around frictional engagement with handle portion 2 (or alternatively with shank portion 4 when so mounted) is slid over the pivotable fastening means between the handle and shank portions and held in place by frictional engagement or by other means as will be evident to those knowledgeable in the art. Thus, FIG. 4b shows one alternative means for keeping slide 11 in place over the foldable joint and FIG. 4c shows another such means. In FIG. 4b, 12 indicates a spring loaded pin set into shank portion 4, which is depressed while slide 11 is slid into position over the foldable joint and which then thru spring pressure engages in hole 13 in the slide when the hole and the pin become aligned. Spring loaded pins on both sides of shank portion will insure greater retentivity of the slide 11 over the joint and greater rigidity of the shaft of the tool.

Another method for retaining slide 11 in place is shown in FIG. 4c where pre-drilled holes in the slide 11 and the handle portion 2 and shank portion 4 are first aligned after which pin 14 is inserted into the aligned holes. The interior of slide 11 contains a horizontal channel to accommodate the protruding bicycle chain link fastener shown when it is slid into position. Obviously the chain link can be mounted so that its outside edges are flush with the sides of handle portion 2 and shank portion 4. Slide 11 and the described means for retaining it in position over the foldable joint are also fully applicable to the foldable joint configuration shown in FIG. 4a.

Other foldable joint configurations and means for holding such joint in a non-pivoting position will readily be apparent to those skilled in the art.

In FIG. 5, which is a plan view of the handle portion 2 shown in FIG. 4, 15 represents a slot into which saw blade 16 will fit when shank portion 4 is folded over onto handle portion 2 as shown in FIG. 3.

In FIG. 6, which represents the shank portion of the tool of this invention in side view, said blade 160 is held in position by pins 17. Slitting knife 18, which can be optionally mounted on shank 4, is pivotably held in place on the shank by pin 19. A plan view of knife 18 is shown in FIG. 6a where portion 20 acts as a detent to prevent the knife from rotating about pin 19 when in the open position, as shown in FIG. 1, or in the closed position as shown in FIGS. 2, 3, 6 and 7. Slot 15 in the handle portion can be conveniently arranged to accommodate the point of slitting knife 18 when the tool is in the folded position shown in FIG. 3. Saw 16 and knife 18 are preferably held in place with drive pins so they can be readily replaced when necessary, although other fastening means are equally satisfactory.

FIGS. 7a and 7b show alternative means to fasten tool heads to the end 5 of shank portion 4. FIG. 7a depicts end 5 in a broken longitudinal section as drilled and tapped to accommodate a screw thread on the tool head, as shown in FIGS. 8a and 9. FIG. 7b shows a shaft and pin type of fastening with a tool head end as depicted in FIG. 8b.

Figure 8B:
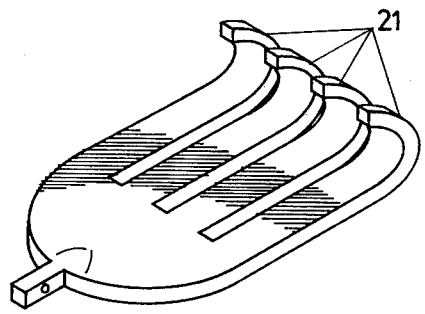
Figure 8C:
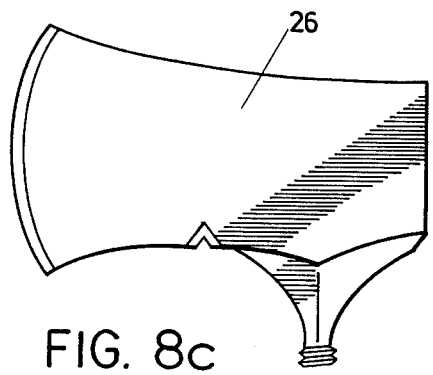

FIGS. 8a, 8b and 8c show different tool heads which can be used with the tool of this invention whether it is used as an eviscerating tool or a survival tool.

When used for eviscerating large game the number of arcuately arranged tines 21 in the claw-like tool head of FIGS. 8a and 8b should generally be greater in number than if the tool head is to be used for small game, fowl or fish. In any event the tines should define at least one slot between them. The edges and points of the curved tines 21 are blunted so that in the eviscerating process they will not puncture or cut the entrails.

The hatchet head 26 shown in FIG. 8c can be conveniently carried for attachment when its function may be needed, as for survival or other purpose. The saw blade obviously finds many purposes, as will be readily apparent.

Figure 9A:
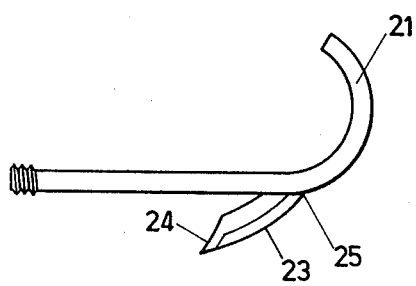
FIG. 9a shows the claw-like tool head of FIG. 8b with a foldable slitting knife pivotably mounted in the slot between the teeth of the claw in open position.
Figure 9B:
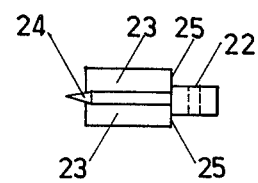

As an alternative to slitting knife 18, mounted on the shank portion of the tool, a slitting knife, as shown in FIG. 9b, can be pivotably fastened between two adjacent tines as shown in FIG. 9a. The knife, shown in FIG. 9b would be positioned between two adjacent tines and pivotably held in place by a pin which would be inserted through drilled hole 22 while wings 23 on each side of the knife blade 24 act as a detent so that the knife will not swing through the slot. The wings 23 bear against adjacent tines while the back edges or shoulders 25 of the wings act as a detent against adjacent tines to prevent the knife from pivotably swinging too far open and to impart rigidity to the knife in use. The front end of wings 23 is wedge shaped to raise the skin of the animal slightly after it is slit by the point and front cutting edge of the knife blade to facilitate the slitting process.

As pointed out hereinbefore the tool of this invention can be in a foldable-shaft configuration as shown in the drawings or can have a non-foldable shaft. In the non-foldable configuration all elements heretofore described can be present except for the foldable joint in the approximate center of the shaft. In either form the tool can be readily carried in the field, preferably in a scabbard as a safety measure, although the foldable configuration obviously offers certain advantages because of its greater compactness in the folded mode.

In application, the foldable-shaft tool of this invention as shown in the drawings and being carried in the folded position shown in FIG. 3 is first unfolded so that the handle portion 2 and shank portion 4 are in end-to-end relation. Slide 11 is then slid over the pivotable connection to engage both the handle portion on one side of the connection and the shank portion on the other side of the connection, thereby providing the tool with a rigid shaft.

If the optional slitting knife 18 is present on the tool it is then moved from its closed position as shown in FIGS. 2 and 3, for example, to the open position shown in FIG. 1. The hooked blade of the knife is inserted through the skin of the belly of the animal, e.g. a deer, usually beginning toward the head end and drawn toward the tail to open the belly and expose the entrails. The slight hook on the end of the cutting blade once it has been inserted under the skin helps to lift the skin as the cut is being made thereby making the cutting process easier. After the appropriate cuts have been made as a safety precaution the knife is pivoted back in the closed position, i.e. as shown in FIGS. 2 and 3.

The tool is then inserted into the chest cavity to hook the lung lining with tines 21 whereupon the tool is twisted in the hand to firmly catch the lung lining or other portions of the entrails in the slots between the tines which are then pulled by the tool toward the pelvic cavity. The tines are then released and the tool is rotated 180° to utilize the saw 16 cut through the pelvic bone after which the entrails are again hooked by tines 21 and pulled completely from the animal. The interior of the carcass can then be further scraped with the claw-like tool head to more completely clean out the cavity.

The same general procedure can be used in applying the tool of this invention to the evisceration of fowl and fish with the saw being utilized to cut off the heads and/or tails of fish and for descaling. Alternatively, the hatchet tool head 26 can be utilized to decapitate fowl and fish.

It should also be apparent that the tool of this invention will find many other uses, both for accomplishing domestic chores, such as in hand gardening to breaking soil, or, utilizing the saw blade 16 or hatchet tool head 26 for trimming bushes and small trees, or for similar functions, as well as the prime function of eviscerating animals, fowl and fish, in practicing survival techniques.

What is claimed is:

1. An eviscerating and survival tool comprising a shaft having a handle at one end, a claw-like hook at the other end, said claw-like hook containing at least two arcuately shaped tines defining at least one slot therebetween, said tines embracing about 180° of arc and being characterized by blunted edges and points, a saw blade demountably attached lengthwise to said shaft between said handle and said claw-like hook nearer the end containing said claw-like hook, and knife means having a cutting portion and a pivot portion, a pivot means bridging said slot between two adjacent ones of said tines of said claw-like hook, said pivot portion being connected to said pivot means thereby allowing pivotal movement of said knife means relative to said tines.

2. The tool of claim 1 wherein the shaft is divided into a handle portion and a shank portion of approximately equal lengths said handle portion and shank portion being connected by pivotable fastening means to permit said handle portion and said shank portion to fold against each other and means for securing said handle portion and shank portion in end-to-end-foldable relationship to provide a rigid shaft.

* * * * *